June 2, 1959 K. E. MAGIN ET AL 2,889,271
METHOD AND APPARATUS FOR GRANULAR SOLIDS TRANSFER
Filed June 30, 1955 3 Sheets-Sheet 2
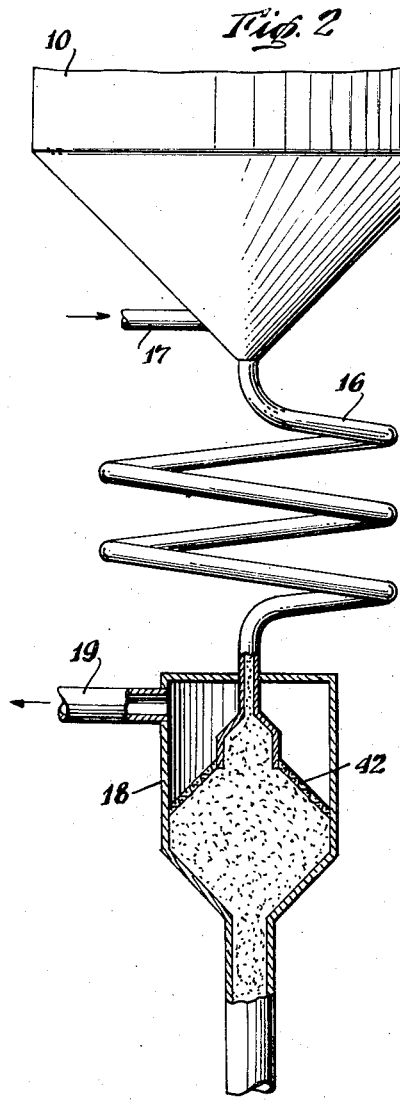
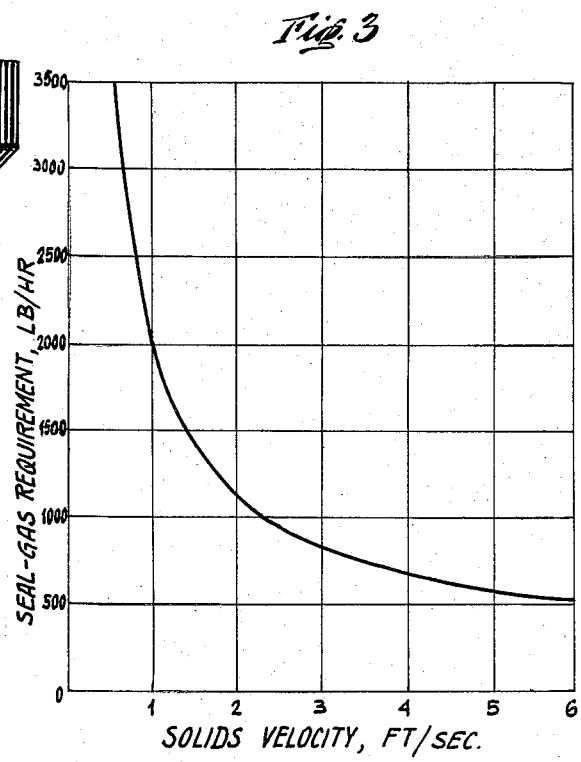
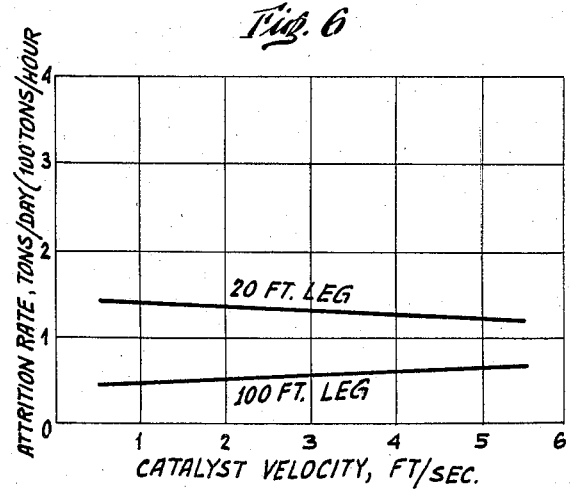
INVENTORS
Kenneth E. Magin
Gerald D. Stuewer
BY
ATTORNEY

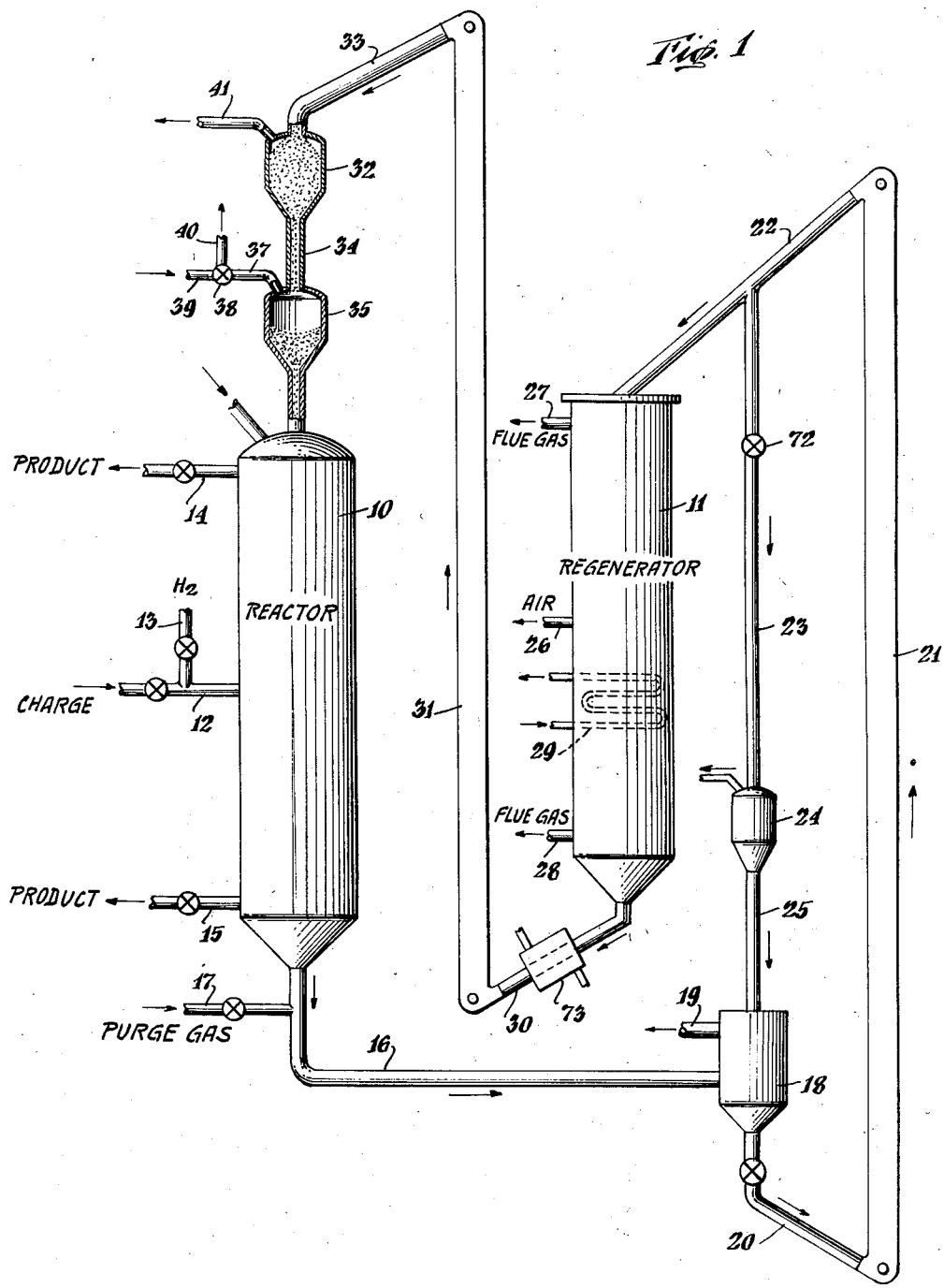

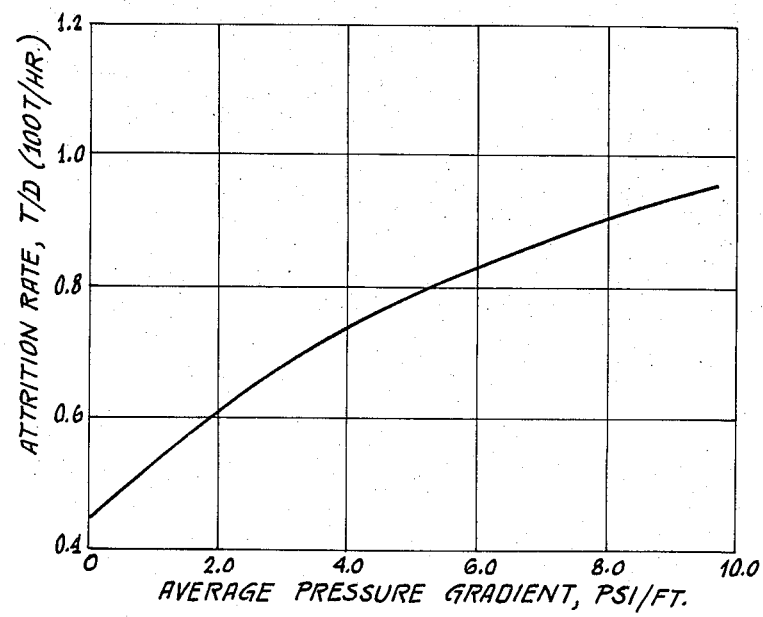
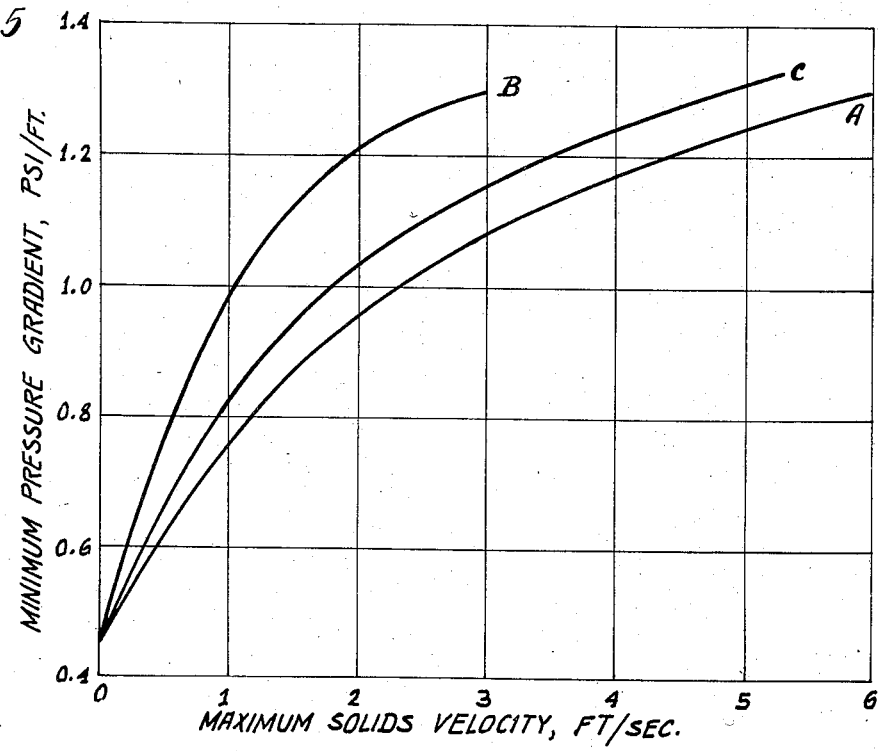

United States Patent Office 2,889,271
Patented June 2, 1959

2,889,271

METHOD AND APPARATUS FOR GRANULAR SOLIDS TRANSFER

Kenneth E. Magin, Barrington, and Gerald D. Stuewer, Mantua, N.J., assignors to Socony Mobil Oil Company, Inc., a corporation of New York Application June 30, 1955, Serial No. 519,216

4 Claims. (Cl. 208—173)

This invention pertains to the transfer of granular solids between two zones, one at a substantially higher pressure than the other. More particularly, this invention deals with the transfer of granular solids from one fluid-solid contacting zone to a second fluid-solid contacting zone at a substantially different pressure in a manner which will continually maintain the pressure in each zone and which will avoid excessive breakage of the contact material.

One typical operation for which this invention is especially suited is the catalytic conversion of fluid reactants, such as hydrocarbons. In such an operation, a granular catalyst is continuously cycled between a confined reaction zone and a confined regeneration zone, passing through each zone as a downwardly moving compact column. The catalyst is passed from the lower end of each zone to the upper end of the other. Various typical processes in which this invention will find application include hydrocarbon reforming, hydroforming, cracking, isomerization, alkylation, isoforming, aromatization, dehydrogenation, hydrogenation, cyclization, dehydrocyclization, treating, polymerization, and coking and visbreaking of hydrocarbons, whether the granular solid used has a catalytic effect on the particular reaction involved or not.

This invention will find application with systems employing solids of palpable particulate form as distinguished from finely divided powders, and the term "granular solids" is used herein to refer to such material. Solids may be of regular shape, such as pellets, tablets, spheres, and the like, or of irregular shape, such as is obtained in grinding and screening operations. Generally, the solids should fall within the size range 1 inch to 100 mesh, and preferably 4 to 15 mesh by Tyler Standard Screen Analysis.

Granular solids suitable for use in catalytic processes include natural or treated clays, bauxite, activated alumina or synthetic associations of silica, alumina, magnesia, or combinations thereof, to which certain metals or metallic oxides or sulfides may be added in small amounts for specific purposes. Granular solids which are inert in character include refractory materials, such as zirkite, corhart, mullite, and stones or metallic particles or balls or particles of coke.

In the aforementioned processes, as well as many others to which this invention applies, it is frequently desirable to operate one of the two zones through which the granular solids are cycled at a pressure substantially different from the other zone. For example, in catalytic hydrocarbon reforming and cracking processes, it is usual to operate the reaction zone at a pressure substantially higher than the regeneration zone. These processes, therefore, require some method and apparatus for passing the solids out of the high pressure zone into the lower pressure zone which accomplishes a continuous steady flow of the solids at the rate of circulation desired while maintaining the pressure in each of the zones at the level desired and avoiding excessive breakage of the solids. The prior art method of accomplishing this was to use an elongated seal leg or column of contact material extending outwardly from the high pressure zone and downwardly at an angle such that the solids would flow through the leg by gravity. An inert seal gas was injected into the upper end of this leg at a pressure slightly in excess of the pressure in the high pressure zone, and the leg was made sufficiently long that the pressure gradient through the leg averaged about 0.3 to 0.9 pound per square inch per foot of leg length. This type of leg was entirely satisfactory when the pressure differential between high and low pressure zones was below about 30 pounds per square inch. However, above this limit the leg which would accomplish depressuring, according to the prior art system, was unduly elongated in a vertical direction, and thereby caused the height of the unit to be markedly increased with attendant increase in construction cost.

It has recently been suggested, in such art as U.S. Patent 2,684,870 to C. E. Berg, that depressuring might be accomplised by flowing the solids upwardly as a compact leg, through which leg the solids would not flow by gravity. However, using an upwardly directed conduit may not be desirable in many installations, and this art does not teach just how such a leg should be designed to minimize solids attrition and to avoid excessive consumption of seal gas.

A major object of this invention is to provide a method and apparatus for transferring granular solids between a high pressure zone and a lower pressure zone which overcomes the above-described difficulty.

Another object of this invention is to provide a method and apparatus for continuously transferring granular solids between a high pressure zone and a lower pressure zone without excessive flow of gaseous material from high pressure to lower pressure zone and without excessive breakage of the granular solids.

Another object of this invention is to provide a method and apparatus for transferring granular solids from a high pressure zone to a lower pressure zone which is of a suitable configuration to avoid excessive additions to the height or lateral dimensions of the contacting unit.

These and other objects of the invention will be apparent from the following detailed description.

It has been the view of those skilled in this art that when the pressure gradient through a seal leg exceeded 1 pound per square inch per foot of leg length, the breakage or attrition of the granular solids would increase with increasing catalyst velocity through the leg. We have discovered that this is not a fact, but that catalyst attrition remains substantially constant through the commercially desirable ranges of catalyst velocity through the leg, and we have utilized this discovery to invent a new type of seal leg for use with high pressure differentials in which both seal gas consumption and catalyst attrition are at a minimum, as well as the seal leg length being as short as is possible.

Broadly, this invention involves passing granular solids from the higher pressure zone into the lower pressure zone as a confined, substantially compact seal leg which lies at an angle with the horizontal such that granular solids will not flow through the leg under the influence of gravity alone. The length and cross-sectional area of the seal leg are controlled in relation to each other, so that the average pressure gradient across the leg falls within the range of 1 to 25 pounds per square inch per foot of leg length, and the velocity of granular solids through the leg falls within the range of about 1.0 to 20 feet per second. In addition, the length and cross-sectional area of the leg are so controlled that the velocity of granular solids through the leg falls within the range of about 50 to 100 percent of the maximum attainable velocity through the leg.

In addition, we have developed a seal leg which takes the form of a helix, and have discovered that this form occupies the least amount of space, both vertically and laterally, and is thus most desirable in many installations where space is at a premium.

By controlling the pressure gradient through the leg, the granular solids velocity through the leg, and by keeping the leg sufficiently small that the catalyst velocity is near the maximum attainable velocity through the leg, we have developed a leg which consumes a minimum amount of seal gas and nevertheless has minimum granular solids attrition connected with it.

This will be more fully understood by referring to the attached drawings, of which Figure 1 is an elevational view, partially in section, illustrating one typical process to which this invention may be applied;

Figure 2 is an elevational view, partially in section, showing the lower end of a high pressure vessel employing a seal leg of preferred design according to this invention;

Figure 3 is a graph illustrating the variation of seal gas consumption in pounds per hour, with solids velocity in feet per second, for one particular design according to this invention;

Figure 4 is a graph illustrating the variation of solids attrition, in tons per day per 100 tons per hour of solids circulated, with pressure gradient in pounds per square inch per foot;

Figure 5 is a graph illustrating the variation of the maximum attainable solids velocity, in feet per second, with pressure gradient, in pounds per square inch per foot, for a given seal leg; and Figure 6 is a curve showing experimental data on the variation of attrition rate, in tons per day per 100 tons per hour of solids circulated, with solids velocity in feet per second for two typical seal legs.

All of these figures are diagrammatic in form and like parts in all bear like numerals.

Turning first to Figure 1, there is illustrated there, diagrammatically, a continuous catalytic reforming process of the moving mass type to which this invention is applicable. The reforming process is chosen merely for purposes of illustration, as this invention has wide applicability to many other kinds of processes as previously noted. Shown in Figure 1 are reactor 10 and regenerator 11, positioned more or less side by side. The granular reforming catalyst, such as a synthetic chromia-alumina catalyst, passes downwardly through the reactor as a substantially compact moving bed. Catalyst might be supplied to the upper end of this bed at temperatures within the range of about 700–1050° F. A hydrocarbon charge, which typically might be a hydrocarbon naphtha preheated to a temperature of about 900–1060° F., is admitted centrally to this bed through passage 12. Hydrogen may be added to the charge before it enters the reactor through passage 13. The mole ratio of hydrogen to naphtha might be 2 to 5.

The charge passes both upwardly and downwardly through the catalyst bed in the reactor and is converted to a product containing large percentages of high octane gasoline. A typical reactor pressure might be 100–300 pounds per square inch absolute. Product is withdrawn from the reactor through passages 14 and 15. The used catalyst, upon which has been deposited a carbonaceous contaminant, is withdrawn from the lower end of the reactor and passed through depressuring leg 16, which is designed and operated according to the method of this invention. Near the inlet end of this leg an inert purge gas or seal gas, such as steam or flue gas, is admitted through conduit 17 and acts to remove any vaporizable hydrocarbon material from the catalyst and to prevent hydrocarbon from escaping from the reactor through passage 16. This seal gas is admitted at a pressure slightly in excess of the pressure in the lower end of reactor 10. Catalyst discharges from the depressuring leg into a disengaging chamber 18, which may be of the type which is described and claimed in detail in U.S. patent application, Serial Number 433,548, filed June 1, 1954. As explained in that application, there is maintained above the lower end of the depressuring leg within disengaging chamber 18, a compact bed of catalyst of sufficient height and cross-section to reduce the velocity of the gas issuing from the depressuring leg below the boiling velocity, and thereby prevent the leg from rapidly emptying itself. Contact material is continually supplied to this bed through passage 25. Gas discharges from disengaging chamber 18 through passage 19, while contact material passes from chamber 18 through passage 20 and is elevated to a point above regenerator 11 by elevator 21. A portion of this elevated catalyst is returned to passage 25 through passage 23 and chamber 24. A major fraction of this catalyst, however, passes into the regenerator and gravitates therethrough as a substantially compact column.

Regenerator 11 might typically be operated at atmospheric pressure and the disengaging chamber 18 would, in any case, be maintained at about the same pressure as the regenerator. An oxygen-containing gas, such as air, is admitted to the central portion of the bed within regenerator 11. This air passes upwardly and downwardly through the catalyst bed therein to burn off the carbonaceous contaminant. Flue gas is removed through passages 27 and 28. Cooling coils 29 may be provided to maintain the temperature of the catalyst below the heat damaging level. The regenerated catalyst is removed from the lower end of the regeneration zone through passage 30 and passed to a cooler 73 to the lower end of a second conveyor 31. Conveyors 21 and 31 may be of any suitable design for transporting hot contact material, such as a gas lift or bucket elevator. Elevator 31 transports catalyst upwardly and discharges it into a supply hopper 32 by means of passage 33. Catalyst then passes into the upper end of the reactor through passage 34, chamber 35 and passage 36, which together comprise a system for feeding the catalyst into the reactor against pressure which is described in claims in U.S. patent application, Serial Number 327,561, filed November 6, 1953, now abandoned.

It is to be noted that the depressuring leg in Figure 1 is in the form of a horizontal conduit through which granular solids will not flow under the influence of gravity. The inlet to this conduit is slightly above its outlet.

In the operation of a granular solids seal leg according to this invention, it is necessary that the velocity of the solids within the leg be maintained within the range about 1 to 20 feet per second and preferably 4 to 6 feet per second. As illustrated by Figure 3, the granular solids velocity is a measure of seal gas consumption. Figure 3 was determined by calculation on a system in which solids were circulated at the rate of 75 tons per hour and a hydrogen recycle gas used as seal gas. The seal leg was 100 feet long and 175 pounds per square inch pressure drop was taken across the leg. Figure 3 depicts the shape of curve that can be expected when routine analysis of any particular system is undergone. Factors which have an influence on the exact curve obtained for any given operation are, for example, type of gas flowing through the leg, temperature of the solids, and type and size of the solids.

Figure 6 shows that, contrary to previous thinking, the attrition rate does not vary substantially with contact material velocity. The curves in Figure 6 are based on experimental data using chromia-alumina reforming catalyst of low strength. The upper line correlates data obtained using a 20 foot seal leg with a 175 pounds per square inch pressure drop thereacross, while the lower line represents data obtained at the same pressure drop across a 100 foot leg.

Considering Figures 3 and 6 together, it will, in general, be desirable to choose a seal leg of a size such that the contact material velocity is as high as possible, since this will give a minimum seal gas loss without affecting attrition. However, too high a velocity may seriously erode the walls of the seal leg pipe, so the 20 feet per second limit given above should not be exceeded.

When considering the length of leg to be used, attrition becomes a problem, as illustrated by Figure 4. Figure 4 is based on experimental data for a specific system and illustrates the shape of attrition curve that will be obtained when routine analysis determines the specific curve for any system under consideration. Factors which influence this curve are the physical properties of the particular granular solid and the configuration of the seal leg. It is apparent from Figure 4 that as the average pressure gradient is decreased attrition is reduced. The average pressure gradient here means the pressure drop across the leg divided by the leg length. Thus, the longer the leg, the lower the attrition. However, the leg should not be so long that pressure gradient therethrough is insufficient to move the solids. Also, it is obvious that there will come a point when the cost of increasing the leg length is greater than the saving on granular solids breakage and seal gas consumption it achieves. In general, the average pressure gradient across the leg should be within the range about 1 to 25 and preferably 1.5 to 5 pounds per square inch per foot of leg length.

In addition to the foregoing limitations on granular solids velocity and pressure gradient through the seal leg, a seal leg designed according to this invention should be operated so that the catalyst velocity through the leg will be 50 percent to 100 percent, and preferably 80 percent to 100 percent of the maximum attainable velocity in the leg. The maximum attainable velocity is the highest velocity that can be attained through a leg of a given cross-sectional area and length at a given pressure gradient. Figure 5, curve A, illustrates the way in which the maximum attainable velocity will vary with pressure gradient. Here, again, the curves in Figure 5 are merely exemplary of what will be obtained by routine analysis of any specific system. Curve B of Figure 5 is the curve for 50 percent, and curve C 80 percent of maximum attainable velocity. Thus, in designing any system according to this invention, the pressure gradient and contact material velocity must be such that they will give a point on Figure 5 between curves A and B and preferably between curves A and C. This will insure that both seal gas consumption and contact material attrition will not be excessive. If the chosen conditions yield a point below curve A, the system will not operate, while if it falls above curve B, the seal gas loss and/or attrition will be excessive.

The pressure gradient used in Figure 5 is the minimum pressure gradient in the leg rather than the average gradient. The pressure gradient may vary throughout the length of any given leg, depending on its cross-sectional shape. For example, with legs of constant cross-sectional area, the minimum pressure gradient will be at the high pressure end of the leg. With a properly tapered leg, such as described in U.S. patent application, Serial Number 329,882, filed January 6, 1953, now U.S. Patent No. 2,829,087, the pressure gradient will be constant throughout the leg. Obviously it is the minimum pressure gradient that is determinative of the maximum attainable solids velocity. The minimum pressure gradient may be calculated using the formula $$\frac{dp}{dL} = \frac{P_1^2 - P_2^2}{2L_T P_1}$$

where $\frac{dp}{dL}$ = minimum pressure gradient $P_1$ = pressure at entrance to the seal leg, $P_2$ = pressure at the exit from the seal leg, and $L_T$ = the total length of the seal leg, all in consistent units.

Figure 2 illustrates a preferred shape of seal leg for use in this invention which takes up minimum over-all space. Where lateral space as well as vertical is limited, so that a single horizontal pipe of the length desired would be objectionable, the helical shape shown in Figure 2 may be utilized. The helix, while shown disposed in a vertical direction, may be arranged in any other way, including vertically, with outlet above the inlet. The disengaging vessel 18, shown in Figure 2, is of the type described and claimed in U.S. patent application, Serial Number 433,640, filed June 1, 1954, now U.S. Patent No. 2,775,600 and utilizes a screen 42, of mesh size less than the granular solids, to prevent seal leg 16 suddenly emptying itself.

When using the helical type seal leg, the loops of the helix should be greater than 3 and preferably greater than 5 times the distance across the seal leg conduit measured in the plane of the loop. The distance across the conduit will be its diameter when it is of circular cross-section.

Whether the leg be straight or helical, it may, if desired, be tapered in any manner, such as that described and claimed in U.S. patent application, Serial Number 329,882, filed January 6, 1953. The cross-section of the leg may be any shape, although circular legs are generally preferred because of ease of fabrication.

This invention will, in general, be applicable to systems employing granular solids of a bulk density within the range about 20 to 80 pounds per cubic foot. The bulk density of the solids is the density measured in the condition in which they exist when poured into a container, and thus it includes void space between the particles and in the pores of the solid, if it is porous.

*Example*

A seal leg was constructed, according to this invention, for use in a Thermofor catalytic reforming unit. It was necessary that this leg depressure the reforming catalyst stream, circulated at a rate of 75 tons per hour, from 190 pounds per square inch absolute to 15 pounds per square inch absolute. The depressuring leg was constructed of straight circular pipe, having a 9 inch inside diameter. The leg was 100 feet in length, so that the average pressure gradient through the leg was 1.75 pounds per square inch per foot of leg length. The catalyst velocity was about 2 feet per second. The leg consisted of seven straight sections which were arranged to roughly correspond to 1½ turns of a helix, with the entire leg, however, lying in a single horizontal plane. Seal gas, having a molecular weight of about 23, was supplied to the seal leg adjacent its inlet end at a pressure of about 175.5 pounds per square inch absolute. Seal gas consumption was about 1670 pounds per hour, and it was estimated that attrition through the seal leg was about 0.5 tons per day per 100 tons per hour of catalyst circulation.

This invention should be understood to include all changes and modifications of the examples of the invention, chosen herein for purposes of disclosure, which do not constitute departures from the spirit and scope of the invention.

We claim:

1. A method for transferring granular solids from a high pressure zone to a lower pressure zone in a manner which avoids excessive loss of fluid material from the high pressure zone and excessive attrition of the granular solids, which comprises: passing granular solids from the high pressure zone into the lower pressure zone as a confined, elongated seal leg lying at an angle such that the granular solids will not flow therethrough under the force of gravity alone, maintaining the length and cross-sectional area of the seal leg sufficient to provide an average pressure gradient across the leg of about 1 to 25 pounds per square inch per foot of leg length and a granular solids velocity of about 1 to 20 feet per second at all points, and further controlling the length and cross-sectional area of the leg to maintain a granular solids velocity in the leg within the range about 50 to 100 percent of the maximum attainable velocity through the leg.

2. A method for transferring granular solids from a high pressure zone to a lower pressure zone in a manner which avoids excessive loss of gaseous material from the high pressure zone and excessive attrition of the granular solids, which comprises: passing the granular solids of a size within the range about 1 inch to 100 mesh Tyler and having a density within the range about 35 to 60 pounds per cubic foot from the high pressure zone into the lower pressure zone as a confined, elongated seal leg lying at an angle with the horizontal less than the angle of repose of the granular solids so that the granular solids will not flow through the seal leg under the force of gravity alone and having an inlet end on a level at least as high as its outlet end, supplying inert seal gas at a pressure slightly in excess of the pressure in said high pressure zone to said seal leg adjacent its inlet end, maintaining the length and cross-sectional area of the seal leg sufficient to provide an average pressure gradient across the leg of about 1.5 to 5 pounds per square inch per foot of leg length and a granular solids velocity at all points within the leg within the range about 4 to 6 feet per second, and further controlling the length and cross-section of the leg to maintain the granular solids velocity within the leg within the range about 80 to 100 percent of the maximum attainable velocity in the leg.

3. In a hydrocarbon conversion process wherein a granular solid contact material of a size within the range about 1 inch to 100 mesh Tyler and having a density within the range about 35 to 60 pounds per cubic foot is circulated continuously through a high pressure conversion zone and a substantially lower pressure reconditioning zone, the improved method of transferring the contact material from the high pressure zone to the lower pressure zone while avoiding excessive loss of gaseous material from the high pressure zone and excessive attrition of contact material, which comprises: passing contact material from the high pressure reaction zone into a confined disengaging zone, maintained at substantially the same pressure as the reconditioning zone, as a confined substantially compact seal leg of contact material which makes an angle with the horizontal less than the angle of repose of the contact material so that the contact material will not flow through the seal leg under the force of gravity alone and which has an inlet end at least on a level as high as its outlet end; supplying an inert seal gas at a pressure slightly in excess of the pressure in the lower section of the reaction zone to said seal leg adjacent its inlet end; maintaining the length and cross-sectional area of the seal leg such that the average pressure gradient across the leg is within the range about 1.5 to 5 pounds per square inch per foot of leg length and the contact material velocity at all points in the leg is within the range about 4 to 6 feet per second; and further controlling the length and cross-section of the leg to maintain the contact material velocity in the leg within the range about 80 to 100 percent of the maximum attainable velocity through the leg.

4. A method for transferring granular solids from a high pressure zone to a lower pressure zone in a manner which avoids excessive loss of gaseous material from the high pressure zone and excessive attrition of the granular solids, which comprises: passing the granular solids from the high pressure zone into the lower pressure zone as a confined compact seal leg formed in a helical pattern with a vertical axis and turns inclined in a manner such that the solids will not flow through the seal leg under the force of gravity alone, maintaining the length and cross-sectional area of the seal leg sufficient to provide an average pressure gradient across the leg of about 1 to 25 pounds per square inch per foot of leg length and a granular solids velocity at all points through the leg of about 1 to 20 feet per second, and further controlling the length and cross-section of the leg to maintain the granular solids velocity in the leg within the range about 50 to 100 percent of the maximum attainable solids velocity through the leg.

References Cited in the file of this patent

UNITED STATES PATENTS

| | | |
|---|---|---|
| 2,514,722 | Robinson | July 11, 1950 |
| 2,724,619 | Berg | Nov. 22, 1955 |
| 2,772,224 | Shea | Nov. 27, 1956 |

UNITED STATES PATENT OFFICE

CERTIFICATE OF CORRECTION

Patent No. 2,889,271                                                                June 2, 1959

Kenneth E. Magin et al.

It is hereby certified that error appears in the printed specification of the above numbered patent requiring correction and that the said Letters Patent should read as corrected below.

Column 6, lines 10 and 11, after "Serial Number 433,640, filed June 1, 1954," strike out "now U. S. Patent No. 2,775,600".

Signed and sealed this 3rd day of November 1959.

(SEAL)
Attest:

KARL H. AXLINE                                              ROBERT C. WATSON
Attesting Officer                                            Commissioner of Patents